3,062,861
N-[2,3-BIS(p-OXYPHENYL)ALKYL]AMIC
ACIDS AND ESTERS
Kurt J. Rorig, Glenview, and Peter Yonan, Chicago, Ill.,
assignors to G. D. Searle & Co., Chicago, Ill., a corporation of Delaware
No Drawing. Filed June 5, 1961, Ser. No. 114,616
6 Claims. (Cl. 260—471)

This invention relates to N-[2,3-bis(p-oxyphenyl)alkyl] amic acids, esters thereof, and processes whereby these acids and esters can be manufactured. More particularly, this invention relates to chemical compounds of the formula

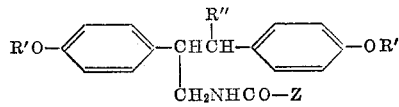

wherein R' and R" represents hydrogen or an alkyl radical and Z represents a (carboxy/carboalkoxy)alkyl radical or corresponding grouping wherein the aliphatic component contains a double bond.

Among the alkyl radicals represented by R' and R", especially lower alkyl radicals are preferred, which is to say methyl, ethyl, propyl, isopropyl, butyl, sec-butyl, tert-butyl, pentyl, neopentyl, hexyl, heptyl, and like $C_nH_{2n+1}$ radicals wherein $n$ represents a positive integer less than 8. Optimally, R' represents hydrogen or a methyl radical and R" represents hydrogen or an ethyl radical.

The radicals represented by Z can be enformulated

—Alk—CO—X wherein Alk represents an alkylene or alkenylene grouping preferably but not necessarily exclusively containing fewer than 3 carbon atoms and X represents hydroxyl or a lower alkoxy grouping, i.e., a grouping of the formula —O— lower alkyl in which the lower alkyl constituent is defined as hereinbefore. Optimally, Z represents a carboxyethyl, carboxyvinyl, or carbo(lower alkoxy)ethyl radical.

The compounds to which this invention relates are useful by reason of their valuable pharmacological properties. For example, they are antibiotic agents effective against fungi such as Trichophyton mentagrophytes and bacteria such as B. subtilis and D. pneumoniae. They also inhibit the incorporation of mevalonic acid in the biosynthesis of cholesterol and otherwise operate to counteract hypercholesterolemia.

Manufacture of the subject compositions proceeds by heating an amine of the formula

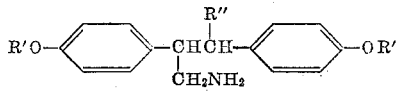

with an acid chloride

Z—CO—Cl in an anhydrous solvent medium such as butanone, a base such as potassium carbonate being present to neutralize the hydrogen chloride liberated in process. Alternatively, the amic acids of this invention can be manufactured by contacting the foregoing amine with an acid anhydride

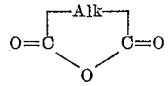

in a chlorinated solvent such as chloroform for periods of time ranging upward from 2 hours, a small amount of dimethylformamide being incorporated in the reaction mixture as a solubilizing agent if desired. The esters hereof can of course be hydrolyzed to corresponding acids with, for example, aqueous alcoholic alkali, and conversely are formed from the appropriate acids by heating with selected alcohols according to the well-known Fischer-Speier technique, using a Lewis acid catalyst such as sulfuric acid, hydrogen chloride, or boron fluoride etherate. The meanings of R', R", Z, and Alk remain as previously asigned.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

Methyl N-[2,3-bis(p-methoxyphenyl)propyl]-succinamate.—To a solution of 22 parts of 2,3-bis(p-methoxyphenyl)propylamine and 13 parts of 3-carbomethoxypropionyl chloride in 280 parts of dry butanone is added 20 parts of powdered anhydrous potassium carbonate. The resultant mixture is heated at the boiling point under reflux with vigorous agitation for 2½ hours, then cooled and partitioned between water and ether. The ether phase is separated, treated with decolorizing charcoal, and stripped of solvent by distillation. The residue is methyl N - [2,3 - bis(p-methoxyphenyl)propyl]succinamate, having the formula

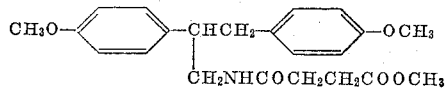

EXAMPLE 2

N - [2,3 - bis(p - methoxyphenyl)propyl]succinamic acid.—A mixture of 4 parts of methyl N-[2,3-bis(p-methoxyphenyl)propyl]succinamate with a solution of 25 parts of sodium hydroxide in 45 parts of water and 20 parts of ethanol is heated at the boiling point under reflux for ¼ hour, then cooled and diluted with 100 parts of water. The resultant solution is washed with ether and then acidified with hydrochloric acid to precipitate N - [2,3-bis(p-methoxyphenyl)propyl]succinamic acid. The product is filtered off and recrystallized from benzene as a colorless material melting at about 112–113°. It has the formula

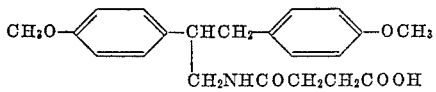

EXAMPLE 3

*N -[2,3-bis(p-methoxyphenyl)propyl]maleamic acid.*—A solution of 27 parts of 2,3-bis(p-methoxyphenyl)propylamine and 10 parts of maleic anhydride in 1490 parts of chloroform is maintained with agitation at 25° for 30 hours. The chloroform is then removed by distillation and the residue taken up in 75 parts of aqueous 2% sodium hydroxide. The sodium hydroxide solution is washed with ether and then acidified with hydrochloric acid. The solid product thrown down is filtered off and recrystallized from aqeous methanol, affording colorless flakes of N-[2,3-bis(p-methoxyphenyl)propyl]maleamic acid melting at 98–100°. The product has the formula

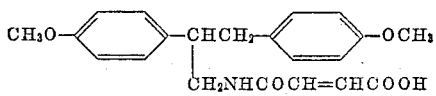

EXAMPLE 4

A. *2,3-bis(p-methoxyphenyl)pentylamine.*—To a vigorously agitated solution of 31 parts of lithium aluminum hydride in 1600 parts of anhydrous ether at the boiling point under reflux is slowly added, during 3 hours, 108 parts of 2,3-bis(p-methoxyphenyl)pentane-nitrile dissolved in 900 parts of anhydrous tetrahydrofuran. When the addition is complete, agitation at the boiling point under reflux is continued for 1 hour longer, whereupon the reactants are chilled while the organometallic adduct formed in process is decomposed by the serial slow addition of 50 parts of water, 30 parts of aqueous 20% sodium hydroxide, and finally 150 parts of water. The resultant mixture is filtered and the filtrate stripped of solvent by vacuum distillation. The residue is 2,3-bis(p-methoxyphenyl)pentylamine melting at approximately 144–145°.

B. *N - [2,3 - bis(p-methoxyphenyl)pentyl]succinamic acid.*—A suspension of 3 parts of 2,3-bis(p-methoxypentyl)pentylamine and 1 part of succinic anhydride in 149 parts of chloroform is maintained with agitation at room temperature for 12 hours, during the first 20 minutes of which solution occurs, followed by precipitation of thin white needles 40 minutes later. At the close of the reaction period, the solid product thrown down is isolated by filtration and dried in air. This material is N-[2,3-bis(p-methoxyphenyl)pentyl]succinamic acid melting at 138–140°. The product has the formula

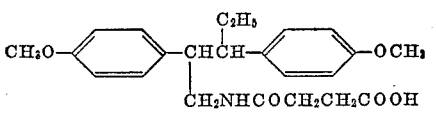

EXAMPLE 5

*Methyl N-[2,3-bis(p-methoxyphenyl)pentyl] - succinamate.*—To a solution of 50 parts of 2,3-bis-(p-methoxyphenyl)pentylamine and 27 parts of 3-carbomethoxypropionyl chloride in 480 parts of butanone is added 40 parts of powdered anhydrous potassium carbonate. The resultant mixture is heated at the boiling point under reflux with vigorous agitation for 2½ hours, then cooled and diluted with 1200 parts of ether. The solution thus obtained is consecutively washed with 500 parts of dilute hydrochloric acid and 500 parts of water, following which it is dried over anhydrous potassium carbonate and stripped of solvent by distillation. The oily residue crystallizes on standing. Recrystallized from a mixture of ether, ethanol, and petroleum ether, it affords methyl N-[2,3-bis(p-methoxyphenyl)pentyl]succinamate melting at approximately 87–88°. The product has the formula

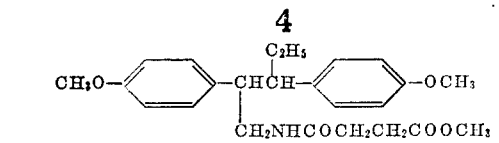

EXAMPLE 6

*Ethyl N - [2,3 - bis(p-methoxyphenyl)pentyl]-succinamate.*—A mixture of 10 parts of N-[2,3-bis-(p-methoxyphenyl)pentyl]succinamic acid, 150 parts of ethanol, and 5 parts of sulfuric acid is heated at the boiling point under reflux for 1 hour, then cooled and partitioned between water and ether. The ether phase is separated and successively washed with aqueous 5% sodium bicarbonate and saturated aqueous sodium chloride, then dried over anhydrous sodium sulfate and stripped of solvent by distillation. The residue is ethyl N-[2,3-bis(p-methoxyphenyl)pentyl]succinamate of the formula

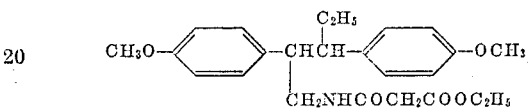

EXAMPLE 7

*N - [2,3 - bis(p - methoxyphenyl)pentyl]maleamic acid.*—Substitution of 1 part of maleic anhydride for the succinic anhydride called for in Example 4B affords, by the procedure there detailed, N-[2,3-bis(p-methoxyphenyl)-pentyl]maleamic acid in the form of a felt-like mat of fine needles melting at about 180–181°. The product has the formula

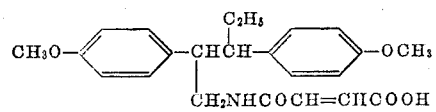

EXAMPLE 8

A. *2,3 - bis(p - hydroxyphenyl)pentylamine hydrobromide.*—A mixture of 17 parts of 2,3-bis(p-methoxyphenyl)pentylamine and 300 parts of aqueous 48% hydrobromic acid is heated at the boiling point under reflux during 8 hours. The pink solution which results, on chilling and standing, precipitates salmon-pink needles of 2,3-bis(p-hydroxyphenyl)pentylamine hydrobromide which, filtered off and dried in air, melt at 238–240°.

B. *2,3-bis(p-hydroxyphenyl)pentylamine.*—A solution of 13 parts of the hydrobromide of the foregoing Part A of this example in 50 parts of water, on neutralization with saturated aqueous sodium carbonate, precipitates 2,3 - bis(p - hydroxyphenyl) - pentylamine as an insoluble solid isolable by filtration.

C. *N - [2,3 - bis(p - hydroxyphenyl)pentyl]succinamic acid.*—A suspension of 27 parts of 2,3-bis(p-hydroxyphenyl)pentylamine and 10 parts of succinic anhydride in a solution of 149 parts of chloroform and 12 parts of dimethylformamide is maintained with vigorous agitation at about 25° for 44 hours. The customary [see Example 4B] slow solution of the starting materials followed by precipitation of product is observed during this time. The white powdery material thrown down, separated by filtration and dried in air, melts at 211–213° with foaming. The product has the formula

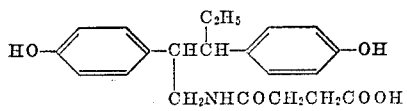

What is claimed is:
1. A compound of the formula

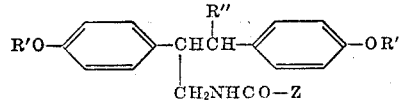

wherein (1) R' is selected from the group consisting of hydrogen and a radical of the formula

—CH$_3$ (2) R" is selected from the group consisting of hydrogen and a radical of the formula

—C$_2$H$_5$ (3) Z is selected from the group consisting of radicals of the formulas

—CH$_2$CH$_2$COOH

—CH=CHCOOH

—CH$_2$CH$_2$CO—OC$_n$H$_{2n+1}$ wherein $n$ represents a positive integer less than 8.

2. N - [2,3 - bis(p - methoxyphenyl)propyl]succinamic acid.

3. N - [2,3 - bis(p - methoxyphenyl)pentyl]succinamic acid.

4. Methyl N - [2,3 - bis(p-methoxyphenyl)pentyl]-succinamate.

5. N-[2,3-bis(p-methoxyphenyl)pentyl]maleamic acid.

6. N-[2,3-bis(p-hydroxyphenyl)pentyl]succinamic acid.

No references cited.

UNITED STATES PATENT OFFICE
CERTIFICATE OF CORRECTION

Patent No. 3,062,861            November 6, 1962

Kurt J. Rorig et al.

It is hereby certified that error appears in the above numbered patent requiring correction and that the said Letters Patent should read as corrected below.

Column 1, line 10, for "-bis(p-xoyphenyl)alkyl]" read -- -bis(p-xoyphenyl)alkyl]- --; column 2, line 10, for "2" read --12 --; line 36, for "propyl]-succina-", in italics, read -- propyl]succina- --, in italics; same column 2, line 57, for "25" read -- 5 --; column 3, line 60, and column 4, line 7, for "pentyl].-succina-", in italics, each occurrence, read -- pentyl]succina- --, in italics; column 6, line 8, for "pentyl]-suc-" read -- pentyl]suc- --.

Signed and sealed this 31st day of December 1963.

(SEAL)
Attest:

ERNEST W. SWIDER

Attesting Officer

EDWIN L. REYNOLDS

Acting Commissioner of Patents